Jan. 11, 1938. C. W. DAKE 2,104,923
BRAKE DRUM
Filed April 6, 1936 2 Sheets-Sheet 1
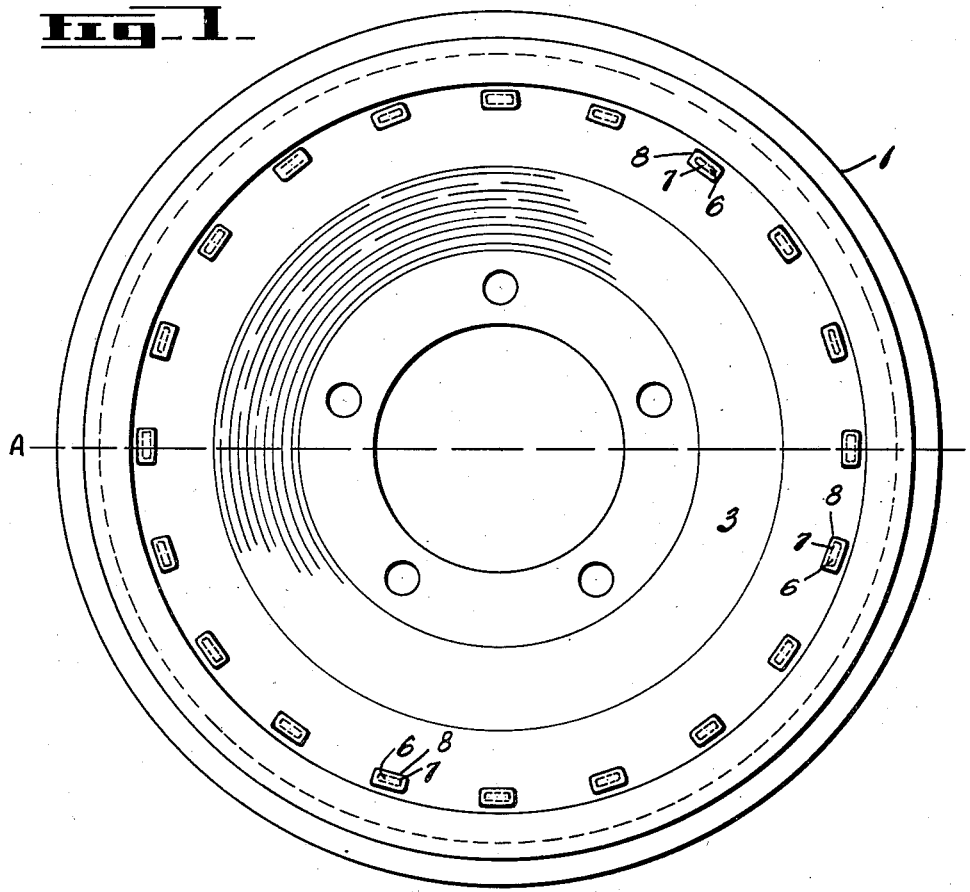
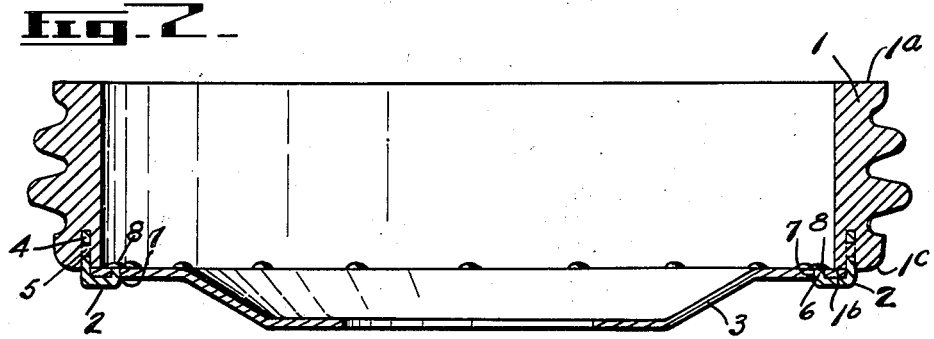
INVENTOR
Charles W. Dake Jan. 11, 1938.    C. W. DAKE    2,104,923
BRAKE DRUM
Filed April 6, 1936    2 Sheets-Sheet 2
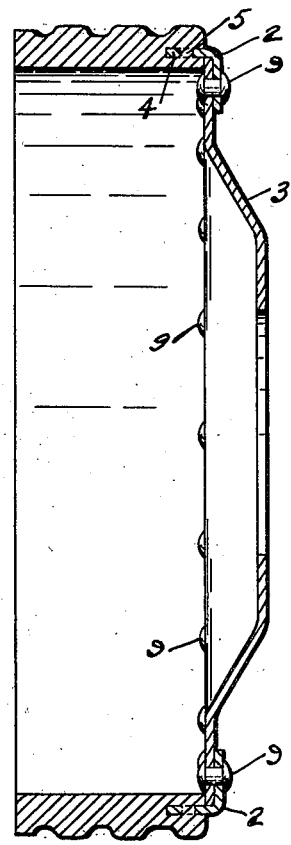
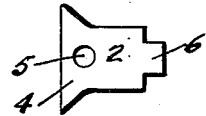
INVENTOR
Charles W. Dake Patented Jan. 11, 1938

2,104,923

UNITED STATES PATENT OFFICE 2,104,923

BRAKE DRUM

Charles W. Dake, Grand Haven, Mich.

Application April 6, 1936, Serial No. 72,926

3 Claims. (Cl. 188—218)

My present invention relates to improvements in brake drums in which a cast metal braking ring member is supported by a wrought metal back member; and the objects of improvement are, first, to provide a brake drum cheap to manufacture; second, to produce a brake drum that can be readily balanced for high rotative speeds and a brake drum of required strength to withstand the sudden stopping of a motor vehicle by the forcible application of the braking mechanism.

I attain these objects by the structure illustrated in the accompanying drawings, in which Fig. 1 is an elevation looking into the open side of my improved brake drum.

Fig. 2 is a sectional view on line A of Fig. 1.

Fig. 3 is a sectional view of a modified structure of my improved brake drum.

Fig. 4 is a plan view of one of the clips by which the braking ring and supporting back member are joined together.

Fig. 5 is an edge view of the clip of Fig. 4, before being bent, and,

Fig. 6 is an edge view of the clip bent to the shape for placing in a mold wherein the braking ring is cast onto the spread end of the clip.

Similar numerals refer to similar parts throughout the several views.

My improved brake drum consists of a cast metal braking ring 1, cast onto a plurality of clips 2, and machined across at one of its edges or sides 1a and the edge 1b inside the clip 2 at the other side 1c. The clips 2 then extend axially from the edge of the braking band. The wrought metal support 3 is then placed against the machined edge 1b of the braking ring, inside the plurality of clips, which clips are held securely in the metal of the braking ring member 1 by the spread end 4 and by the cast metal of the braking ring member within the holes 5 and to secure the supporting back member the portion of the clips projecting from the braking ring member is bent until the tongue 6 is forced through holes 7 in the supporting back member, after which the end of each tongue 6 is headed, forming a rivet 8 securing the clips 2 to the supporting back member 3 and between the body of each clip and the edge 1b of the braking ring member 1. In Fig. 3 each clip is provided with a rivet hole and the supporting back with a plurality of holes corresponding with the holes in the clips which are bent flat against the supporting back member and secured thereto by rivets 9 extending through the holes in the clips and supporting back.

Previous to my present invention brake drums have been made by centrifugally casting into a highly pre-heated steel shell molten iron of a temperature exceeding 2900° F. which temperature is necessary to produce the required fused or intermingling of the iron and the surface steel. When brake drums of this structure were produced, it was found they were not concentric and consequently not in required balance. Other brake drums were made by providing the supporting back with an axially extending flange, placing the back in a mold and casting the braking ring onto the flange of the back. The supporting back and the molten iron, being of greatly different temperatures, had vastly different coefficients of contraction at the temperature of each and strains were set up in both the braking ring and the back which caused the braking ring to warp and be out of balance regardless of the amount of machining done to the braking ring, also the flange of the supporting back would be nearer the surface of the braking ring at some places than at others, resulting in the braking ring becoming cracked, with danger to wrecking the vehicle.

In my present improved brake drum, the above named objections are overcome. The braking ring 1 is cast with the clips 2 extending substantially axially from one of its edges. After being cast and cooled, it is machined to relieve all strains caused by shrinkage in cooling and to produce a perfectly true annular ring of uniform radial thickness.

Having described my present invention, I claim

1. A brake drum comprising a cast metal braking ring member having a plurality of bendable metal clips extending axially outwardly of the braking member, then radially inward and axially therefrom and a supporting back for the braking ring member secured to the axially extending portion of the said clips.

2. A brake drum structure comprising a cast metal braking ring member having a plurality of independent metal clips embedded into one of its radial sides a portion of their length, and a portion extending axially therefrom, each clip having in spaced apart relation to said ring member a portion extending radially toward the axis of the ring member, a supporting back for the ring member having its peripheral margin interposed between said radial side of the ring member and the radially extending portion of the clips with its periphery engaged by the axially extending portion of the clips whereby the said back is concentrically located with relation to the braking ring.

3. A brake drum structure comprising a cast metal braking ring member having a plurality of independent metal clips embedded into one of its radial sides a portion of their length, and a portion extending axially therefrom, each clip having in spaced apart relation to said ring member a portion extending radially toward the axis of the ring member, a supporting back for the ring member having its peripheral margin interposed between said radial side of the ring member and the radially extending portion of the clips.

CHARLES W. DAKE.